(12) United States Patent
Crean

(10) Patent No.: US 7,234,761 B1
(45) Date of Patent: Jun. 26, 2007

(54) SIDE MOUNTED AWNING ASSEMBLY FOR RECREATIONAL VEHICLES

(75) Inventor: Johnnie R. Crean, Chino, CA (US)

(73) Assignee: Alfa Leisure, Inc., Ontario, CA (US)

( * ) Notice: Subject to any disclaimer, the term of this patent is extended or adjusted under 35 U.S.C. 154(b) by 0 days.

(21) Appl. No.: 11/436,118

(22) Filed: May 17, 2006

Related U.S. Application Data

(62) Division of application No. 10/883,022, filed on Jun. 30, 2004, now Pat. No. 7,055,890.

(60) Provisional application No. 60/484,000, filed on Jun. 30, 2003.

(51) Int. Cl.
*B60J 1/00* (2006.01)

(52) U.S. Cl. .................. 296/180.4; 296/180.1

(58) Field of Classification Search ............ 296/180.1, 296/163, 171, 175, 180.4; 160/160, 67, 22, 160/71, 66; 135/88.12, 88.1, 88.11, 88.01
See application file for complete search history.

(56) References Cited

U.S. PATENT DOCUMENTS

| | | | |
|---|---|---|---|
| 1,443,373 A | | 1/1923 | Miles et al. |
| 3,239,267 A | * | 3/1966 | Reynolds ................. 296/180.4 |
| 3,425,740 A | * | 2/1969 | Vaughn .................... 296/180.4 |
| 3,814,472 A | * | 6/1974 | Zelikovitz ................ 296/180.4 |
| 4,021,069 A | | 5/1977 | Hersh |
| 4,098,534 A | | 7/1978 | Wood |
| 4,135,754 A | | 1/1979 | FitzGerald et al. |
| 4,142,755 A | * | 3/1979 | Keedy ..................... 296/180.4 |
| 4,170,378 A | * | 10/1979 | Jacobsen ................. 296/180.4 |
| 4,257,641 A | * | 3/1981 | Keedy ..................... 296/180.4 |
| 4,258,778 A | * | 3/1981 | Upton et al. .................. 160/67 |
| 4,281,869 A | * | 8/1981 | Saint ....................... 296/180.4 |
| 4,313,635 A | | 2/1982 | Front |
| D266,158 S | | 9/1982 | Sullivan |
| 4,451,074 A | * | 5/1984 | Scanlon ................... 296/180.4 |
| 4,458,936 A | * | 7/1984 | Mulholland .............. 296/180.4 |
| 4,474,403 A | | 10/1984 | Miller |
| 4,601,508 A | * | 7/1986 | Kerian ..................... 296/180.4 |
| 4,629,241 A | | 12/1986 | Gruich |
| 4,702,509 A | * | 10/1987 | Elliott, Sr ................ 296/180.4 |
| 4,707,015 A | * | 11/1987 | Klomfass ................. 296/180.4 |
| 4,801,119 A | | 1/1989 | Pelletier |
| 4,818,015 A | * | 4/1989 | Scanlon ................... 296/180.1 |
| 4,874,184 A | | 10/1989 | Boyer |

(Continued)

*Primary Examiner*—Kiran B. Patel
(74) *Attorney, Agent, or Firm*—Knobbe, Martens, Olson & Bear, LLP

(57) ABSTRACT

An awning assembly for the front portion of a recreational vehicle. The awning assembly in a closed position provides an aerodynamic profile for the front portion of the recreational vehicle, so that a front wall can be arranged to allow more efficient use of the interior. In one embodiment, the front wall is vertical so that the front portion of the interior has a full ceiling height. The awning assembly in an open position helps to block out external elements, so that the front wall can be used more efficiently. In one embodiment, the front wall includes a window, and the awning assembly provides a shade for that window while allowing an occupant to look outside towards the front of recreational vehicle. Various structures and methods for implementing the awning assembly to the front portion of the recreational vehicle are disclosed.

8 Claims, 14 Drawing Sheets

U.S. PATENT DOCUMENTS

| | | |
|---|---|---|
| 4,941,524 A | 7/1990 | Greer |
| 4,966,407 A | 10/1990 | Lusk |
| 5,148,848 A | 9/1992 | Murray et al. |
| D338,442 S | 8/1993 | Callan |
| 5,332,280 A * | 7/1994 | DuPont et al. ............ 296/180.1 |
| 5,348,366 A * | 9/1994 | Baker et al. .............. 296/180.4 |
| 5,417,468 A | 5/1995 | Baumgartner et al. |
| 5,487,586 A * | 1/1996 | Kinkaide ................. 296/180.1 |
| 5,498,059 A * | 3/1996 | Switlik .................... 296/180.1 |
| 5,611,380 A | 3/1997 | Landy |
| 5,700,048 A | 12/1997 | Wade et al. |
| 5,752,556 A * | 5/1998 | Steadman ..................... 160/71 |
| D415,085 S | 10/1999 | Fitzgerald et al. |
| 6,021,835 A | 2/2000 | Malott |
| 6,092,861 A * | 7/2000 | Whelan ................... 296/180.4 |
| 6,098,693 A | 8/2000 | Frey, Jr. |
| 6,135,539 A | 10/2000 | Bailey et al. |
| 6,257,654 B1 * | 7/2001 | Boivin et al. ............. 296/180.4 |
| 6,260,909 B1 | 7/2001 | Crean et al. |
| 6,286,894 B1 | 9/2001 | Kingham |
| 6,293,612 B1 | 9/2001 | Crean |
| 6,309,010 B1 * | 10/2001 | Whitten ................... 296/180.4 |
| 6,485,087 B1 * | 11/2002 | Roberge et al. .......... 296/180.4 |
| 6,494,246 B1 | 12/2002 | Blevins |
| 6,505,873 B1 | 1/2003 | Crean |
| 6,623,058 B1 | 9/2003 | Crean |
| 6,666,498 B1 * | 12/2003 | Whitten ................... 296/180.4 |
| 6,854,788 B1 * | 2/2005 | Graham ................... 296/180.4 |
| 6,886,875 B1 | 5/2005 | Crean |
| 7,104,591 B1 * | 9/2006 | Sanns ....................... 296/180.1 |
| 2003/0094833 A1 | 5/2003 | Thmopson et al. |

\* cited by examiner

SIDE MOUNTED AWNING ASSEMBLY FOR RECREATIONAL VEHICLES

PRIORITY APPLICATIONS

This application is a divisional of U.S. patent application Ser. No. 10/883,022 filed Jun. 30, 2004, U.S. Pat. No. 7,055,890, titled "Awning For Recreational Vehicles," which claims priority benefit of U.S. Provisional Patent Application No. 60/484,000 filed Jun. 30, 2003, titled "Awning For Recreational Vehicles," which is incorporated herein by reference in its entirety.

BACKGROUND

1. Field

The present teachings relate to recreational vehicles and, in particular, to an awning for recreational trailers.

2. Description of the Related Art

A recreational vehicle (RV) typically includes a housing mounted on top of a chassis. Also mounted to the chassis is one or more axles with wheels attached thereon so as to allow rolling of the RV. The RV can be either pulled by a towing vehicle, or be self propelled. Towed RVs can include a tent trailer, a trailer, and a fifth-wheel trailer.

Many RVs have an awning that can be deployed when at rest so as to provide a cover from sun and rain. A typical conventional awning is positioned along the side of the RV such that when deployed, provides a cover from the sun and rain so as to enhance the use of the RV. Conventional awnings can be retracted close to the side of the RV, and when retracted, conventional awnings generally do any other function. Thus, there is a continuing need to improve the manner in which awnings are implemented on RVs.

SUMMARY

The foregoing needs can be addressed by an awning assembly for the front portion of a recreational vehicle. The awning assembly in a closed position provides an aerodynamic profile for the front portion of the recreational vehicle, so that a front wall can be arranged to allow more efficient use of the interior. In one embodiment, the front wall is vertical so that the front portion of the interior has a full ceiling height. The awning assembly in an open position helps to block out external elements, so that the front wall can be used more efficiently. In one embodiment, the front wall includes a window, and the awning assembly provides a shade for that window while allowing an occupant to look outside towards the front of recreational vehicle.

One aspect of the present teachings relates to a recreational vehicle having a chassis with wheels mounted thereto so as to allow rolling motion. The recreational vehicle further includes a main housing mounted to the chassis. The main housing has a front wall, a rear wall, and at least two side walls interposed between the front and rear walls so as to define an interior space having a roof and a floor. The recreational vehicle further includes an awning assembly mounted adjacent the front wall so as to be movable between a closed configuration and an open configuration. The awning assembly has a side profile shape that has a front contour and a rear contour. The front contour is separated from the rear contour by varying thickness so that when in the closed configuration the rear contour conforms to the profile of the front wall and the front contour provides an aerodynamic shape to a front portion of the recreational vehicle. The awning assembly in its open configuration provides a cover for at least a portion of the front wall from external elements.

In one embodiment, the recreational vehicle is a fifth-wheel trailer. In one embodiment, the awning assembly includes a shell structure mounted to a hinge assembly disposed adjacent the top portion of the front wall. The shell structure in its closed configuration provides the aerodynamic shape. The shell structure can swing out and upward about the hinge assembly so as to be in its open configuration providing a cover above and in front of the front wall.

In one embodiment, the awning assembly further includes at least one extension pole that provides support for the shell structure in its open configuration. In one embodiment, the awning assembly further includes at least one power strut that assists opening and closing of the shell structure. In one embodiment, the shell structure includes a curved portion and a panel portion joined together so as to form the shell structure. In one embodiment, the shell structure includes ribbed features that provided resistance to warping and flexing of the shell structure. In one embodiment, the shell structure includes a brace imbedded within shell structure and attached to the hinge assembly. The brace includes two rigid rods, with each rod having a first end and a second end. The first ends of the two rods are attached to the ends of the hinge assembly and the second ends of the two rods are attached to each other, thereby forming a triangular bracing structure that directly couples the shell structure to the hinge assembly.

In one embodiment, the front wall is oriented substantially perpendicular to the roof and the floor to provide more efficient use of the front portion of the interior space. The shape of the awning assembly provides the aerodynamic profile to an otherwise non-aerodynamic profile associated with the perpendicular front wall.

Another aspect of the present teachings relates to a recreational vehicle having a chassis with wheels mounted thereto so as to allow rolling motion. The recreational vehicle further includes a main housing mounted to the chassis. The main housing has a front wall, a rear wall, and at least two side walls interposed between the front and rear walls so as to define an interior space having a roof and a floor. The recreational vehicle further includes a cover mounted adjacent the front wall so as to be movable between a closed configuration and an open configuration. The cover has a side profile shape that has a first contour and a second contour. The first contour is separated from the second contour by varying thickness so that when in the closed configuration the second contour conforms to the contour of the front wall and the first contour provides a desired contour to a front portion of the recreational vehicle that is different than the contour of the front wall. The cover in its open configuration provides a cover for at least a portion of the front wall.

In one embodiment, the recreational vehicle is a fifth-wheel trailer. In one embodiment, the cover includes a shell structure mounted to a hinge assembly disposed adjacent the top portion of the front wall. The shell structure in its closed configuration has an aerodynamic shape. The shell structure can swing out and upward about the hinge assembly so as to be in its open configuration providing a cover above and in front of the front wall.

In one embodiment, the cover includes two side-mounted members that hingeably move about the two side edges of the front wall. The two side-mounted members in their closed configuration provide an aerodynamic shape. The two side-mounted members can swing out sideways about their respective hinges so as to be in their open configuration providing a cover to at least a portion of the front wall.

In one embodiment, the cover further includes at least one extension pole that provides support for the cover in its open configuration. In one embodiment, the cover includes a curved portion and a panel portion joined together so as to form a shell structure. In one embodiment, the shell structure includes ribbed features that provided resistance to warping and flexing of the shell structure. In one embodiment, the shell structure further includes a brace imbedded within the shell structure and attached to a hinge assembly thereby providing a robust coupling of the shell structure to the hinge assembly.

In one embodiment, the front wall is oriented substantially perpendicular to the roof and the floor to provide more efficient use of the front portion of the interior space. The shape of the cover provides an aerodynamic profile to an otherwise non-aerodynamic profile associated with the perpendicular front wall.

Yet another aspect of the present teachings relates to a method of fabricating a trailer. The method includes positioning a front wall of the trailer in a generally perpendicular manner with respect to a roof and a floor of the trailer. The front wall, the roof, and the floor define a front portion of an interior of the trailer. The front wall being perpendicular to the roof and floor allows for a relatively more efficient use of the front portion of the interior than would an angled front wall. The method further includes providing an external cover that movably covers the exterior side of the front wall. The external cover can move from a closed position adjacent the front wall to an open position that blocks out external elements from at least a portion of the front wall. The external cover in its closed position provides a shape to the front portion of the trailer that is more aerodynamically efficient than that of a perpendicular front wall alone.

BRIEF DESCRIPTION OF THE DRAWINGS

These and other aspects, advantages, and novel features of the present teachings will become apparent upon reading the following detailed description and upon reference to the accompanying drawings. In the drawings, similar elements have similar reference numerals.

DETAILED DESCRIPTION OF SOME EMBODIMENTS

Figure 1:
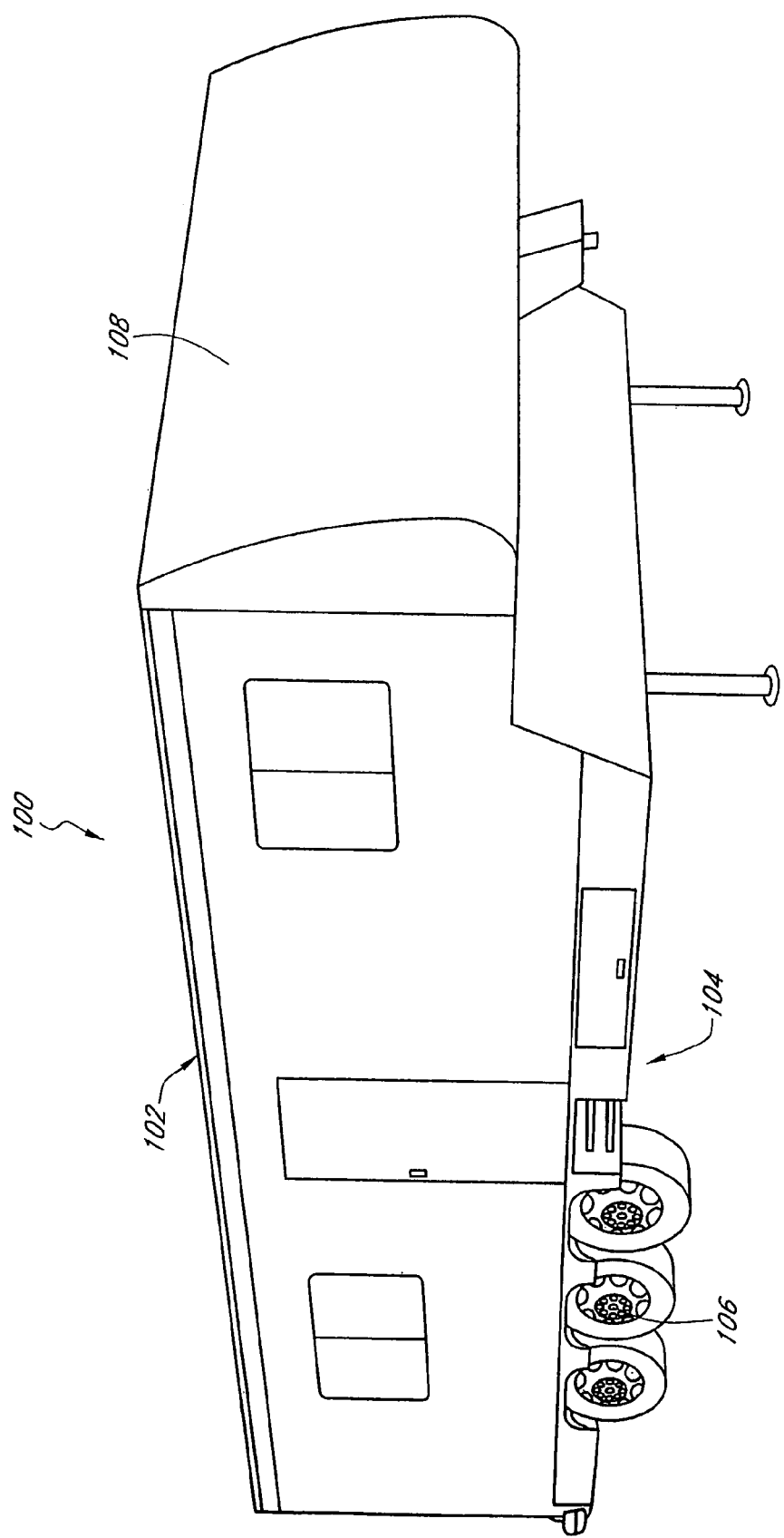
FIG. 1 shows one embodiment of a recreational vehicle having a front awning.

FIG. 1 shows one embodiment of a recreational vehicle (RV) 100 having a housing 102 mounted on a chassis 104. One or more axles 106 with wheels may be mounted to the chassis 104 so as to allow the RV 100 to roll. Some embodiments of the RV, such as a motorhome, may be adapted to be self-propelled. Other embodiments of the RV, such as a trailer, may be adapted to be towed by a towing vehicle. For the purpose of description, a fifth-wheel trailer is used to describe the various aspects of the present teachings. It will be understood, however, that this is in no way intended to limit the scope of the present teachings. It will be appreciated that the various aspects of the present teachings disclosed herein may be implemented in other types of RVs.

One aspect of the present teachings relates to a front awning 108 disposed at the front portion of the RV 100. Such an awning will be shown to provide various advantageous features for the RV 100 when in both deployed and retracted configurations.

Figure 2A:
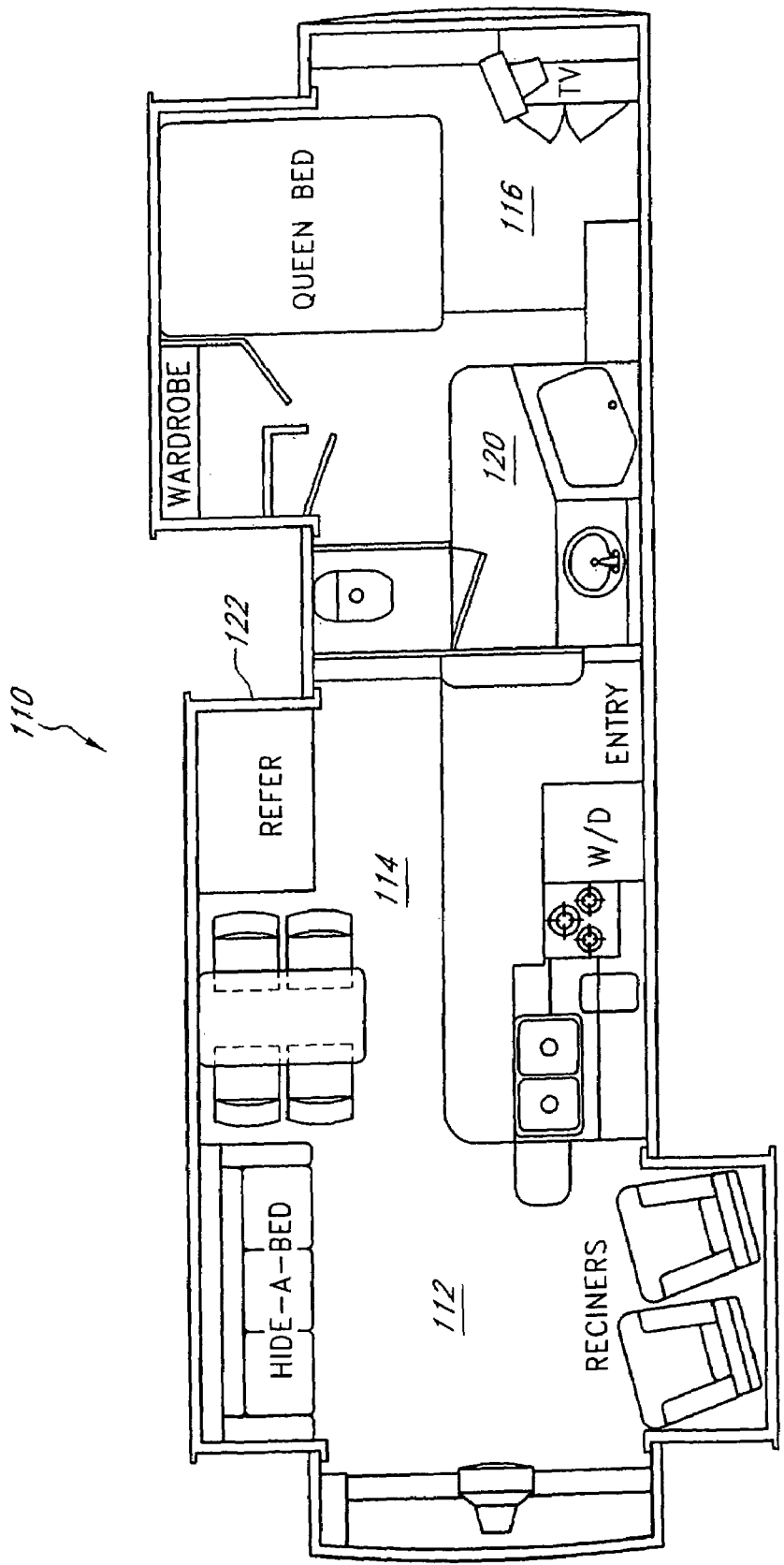
FIGS. 2A and B show example floorplans of the recreational vehicle.

FIGS. 2A and B show two example interior configurations for the example RV 100. Typically, the interior of the RV is enclosed by the housing (102 in FIG. 1). The housing typically includes a front wall, a rear wall, two side walls, a roof, and a floor. As shown in FIG. 2A, an example floorplan 110 may be configured to provide relatively comfortable living conditions while traveling, camping, and the like. The example floorplan 110 may include a living area 112, a cooking and eating area 114, a sleeping area 116, and a bathroom area 120. In some embodiments, the housing may also include an extendable slideout 122 that increases the size of the interior when extended. As is generally understood, features such as the size and comfort level of the RV may vary greatly, depending on users' needs and/or wants.

Figure 2B:
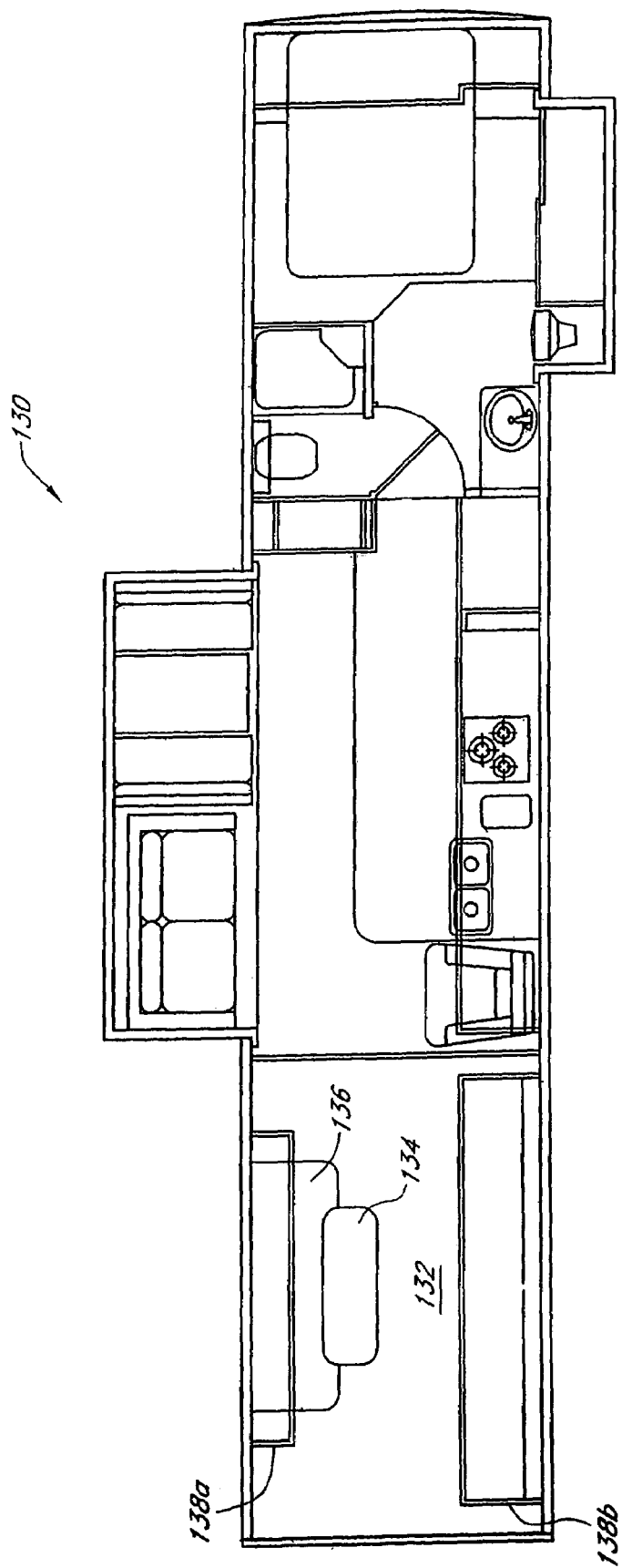

Other embodiments of the RV may have their interiors configured for other purposes. FIG. 2B shows an example floorplan 130 configured to provide a large hauling space 132 adjacent the rear of the RV. To provide space for hauling equipments and to make the space useful when the equipments are unloaded, the hauling space 132 may be configured with movable furniture. For example, the hauling space 132 may include a removable table 134 and a fold-down bed 136 that could function as a seat for the table 134. In FIG. 2B, the example hauling space 132 also includes raised storage compartments 138a, b positioned away from the floor and adjacent the ceiling so as to retain useful area for hauling purposes.

RVs having such a floorplan may allow the user to haul outdoor recreational equipments such as dirt-bikes, all-terrain vehicles, and the like. Such an RV provides a secure enclosed hauling space for the equipments that are oftentimes expensive. Once the users reach their destination at an outdoor recreational area, the equipments can be unloaded, and the hauling space can be converted and used as an enclosed camping space that provides comfort and protection from the outdoor elements.

Figure 3:
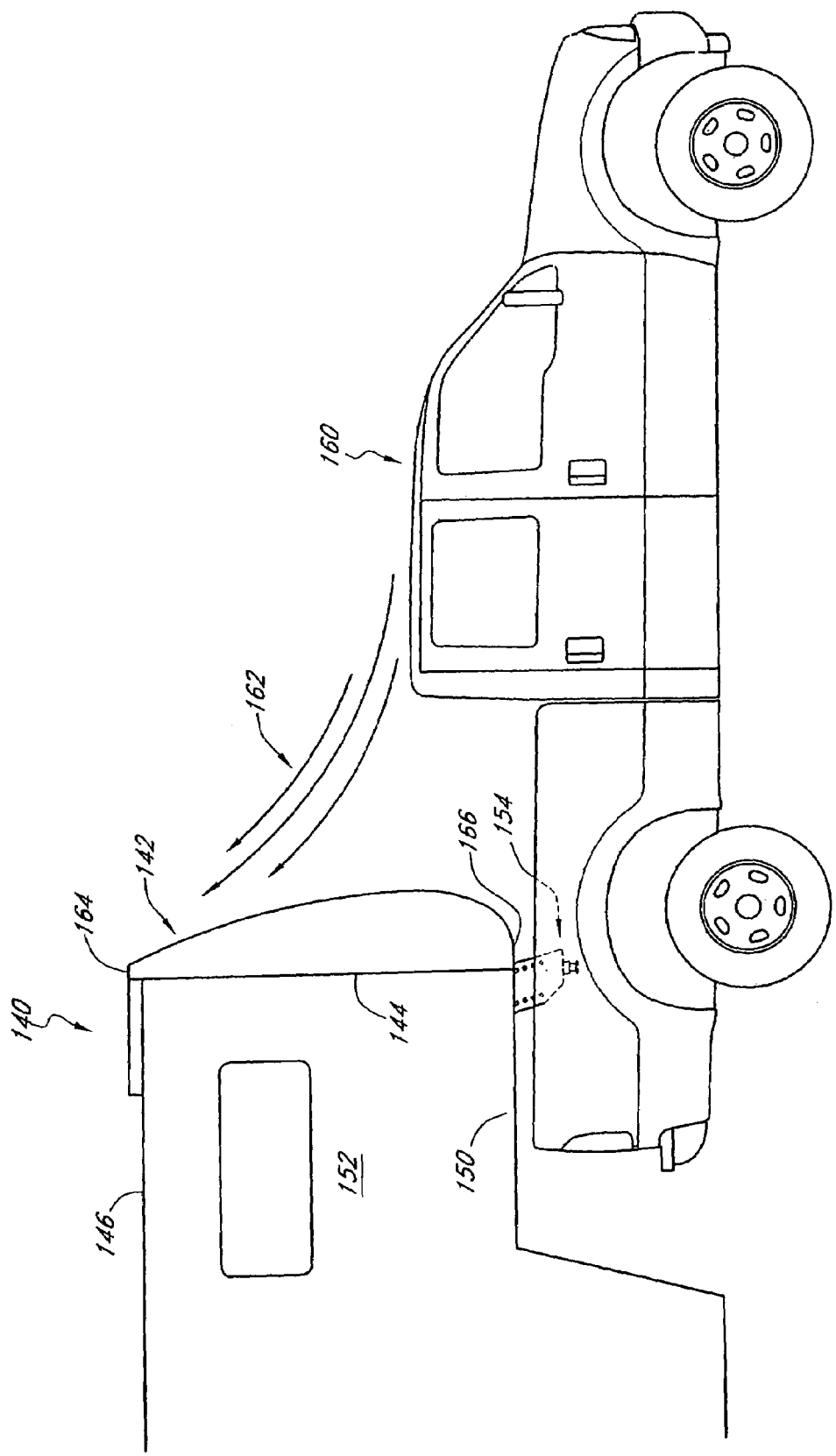
FIG. 3 shows a side view of the recreational vehicle being towed by a towing vehicle, showing that the front awning may be shaped so as to provide an aerodynamic shape of the front portion of the recreational vehicle.

FIG. 3 shows a front portion of one embodiment of a trailer 140 coupled to a towing vehicle 160. Typically, a hitch 154 disposed adjacent the front bottom portion of the trailer 140 couples to a hitch receiver (not shown) of the towing vehicle 160. The front portion of the trailer 140 includes a roof 146, a floor 150, a front wall 144, and two sidewalls 152 that define the front portion of an interior space. In one embodiment, the front wall 144 is generally perpendicular to the floor 150, the two sidewalls 152, and the roof 146.

In one embodiment, the front portion of the trailer 140 further includes a front awning 142 having a hinged end 164 and an opening end 166. The hinged end 164 of the front awning 142 is hingeably attached to the trailer 140 adjacent the top portion of the front wall 144 so as to allow the front awning 142 to swing upward about the hinged end 164 in a manner described below.

In one embodiment, the side profile of the front awning 142 has an aerodynamic shape so as to deflect airflow 162 impinging on the front portion of the trailer 140 as it moves while being towed. It will be appreciated that the front awning 142 may have any number of shapes, with some shapes being more aerodynamic than others, without departing from the spirit of the present teachings. Thus, the front awning 142 being configurable in any number of shapes allows the front portion of the trailer 140 to be aerodynamically shaped when traveling, while allowing the front wall 144 to be oriented in a generally vertical manner.

As shown in FIG. 3, the aerodynamic shape of the front awning 142 is achieved by its profile. The profile of the awning 142 can be one of many different shapes, but generally, the profile has a thickness that varies so as to form a desired shape. In the example profile shape shown in FIG. 3, the thickness of the profile is greatest near the bottom portion of the (closed) awning 142, such that air 162 is deflected upward and around the top portion of the trailer. It will be understood that the amount of upward and/or downward deflection of the air can be adjusted by having a different thickness profile.

Figure 4:
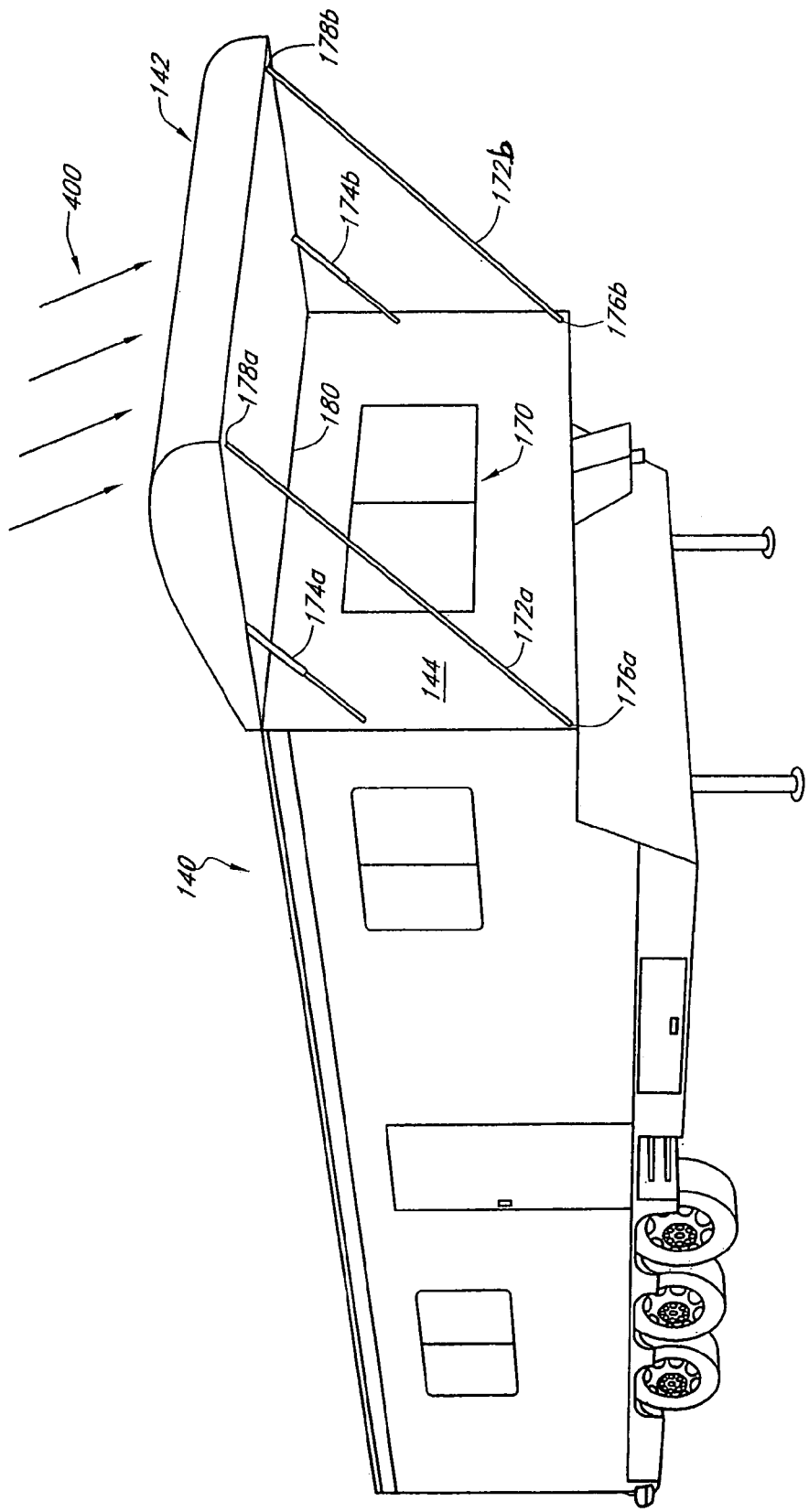
FIG. 4 shows the front awning in a deployed configuration.

FIG. 4 shows a perspective view of the trailer 140 with its front awning 142 in a deployed configuration. In one embodiment, deploying of the front awning 142 includes having the front awning 142 swing upward about a hinge 180 adjacent the top portion of the front wall 144. The deployment of the front awning 142 may be assisted by power struts 174a and 174b, thereby allowing the front awning 142 to be deployed by a single user. Such power struts 174a, b may be gas charged and be similar to common power struts found on tailgates of many sports-utility vehicles and mini-vans. A possible manner in which the power struts 174a, b may be coupled to the front awning 142 and the front wall 144 is described below in greater detail.

In one embodiment, the deployed front awning 142 may be supported by extension poles 172a and 172b. A first end of each of the extension poles 172a, b is coupled to a first coupling location (178a, b) near the corresponding lateral end of the opening end (166 in FIG. 3) of the front awning 142. A second end of each of the extension poles 172a, b is coupled to a second coupling location (176a, b) near the corresponding lower corner of the front wall 144. It will be understood that the meaning of the lateral end of the opening end 166 of the front awning 142 may include any area proximate the lateral end portions of the opening end 166. Similarly, it will be understood that the meaning of the lower corner of the front wall 144 may include any area proximate the lower corners of the front portion of the trailer 140.

The angled bracing provided by the extension poles 172a, b provides support for the deployed front awning 142. The weight of the front awning 142 is at least partially supported by the extension poles 172a, b. In certain windy situations, the front awning 142 may experience an uplifting force, and the extension poles 172a, b can also prevent the front awning 142 from swinging upward beyond the deployed configuration. Furthermore, because the extension poles 172a, b generally prevent the rotational (swinging) motion, and the hinge 180 generally prevents the lateral swaying motion, the deployed front awning 142 can be deployed in a relatively stable manner. In some embodiments, the front awning 142 may be formed in a manner that promotes its own structural rigidity, thereby improving the manner in which the aforementioned support is provided. Various embodiments of the extension poles and their implementations are described below in greater detail.

Although the extension poles disclosed herein are described as being coupled to locations proximate the corners of the front awning and the front wall, it will be appreciated that such angled bracing does not necessarily have to be coupled near the corners. One end of an angled bracing extension pole may be located anywhere on or about the front wall, and the other end may be located anywhere on or about the interior portion of the front awning without departing from the spirit of the present teachings.

FIG. 4 also shows that in one embodiment, the front wall 144 can include a window 170 that faces forward, thereby allowing the occupants to look outside when the front awning 142 is deployed. The front awning 142 in the deployed configuration provides a cover for areas adjacent the front portion of the trailer 140. Thus, the window 170 can be shielded from some of the undesirable elements such as harsh sunlight or rain (depicted as arrows 400).

Figure 5A:
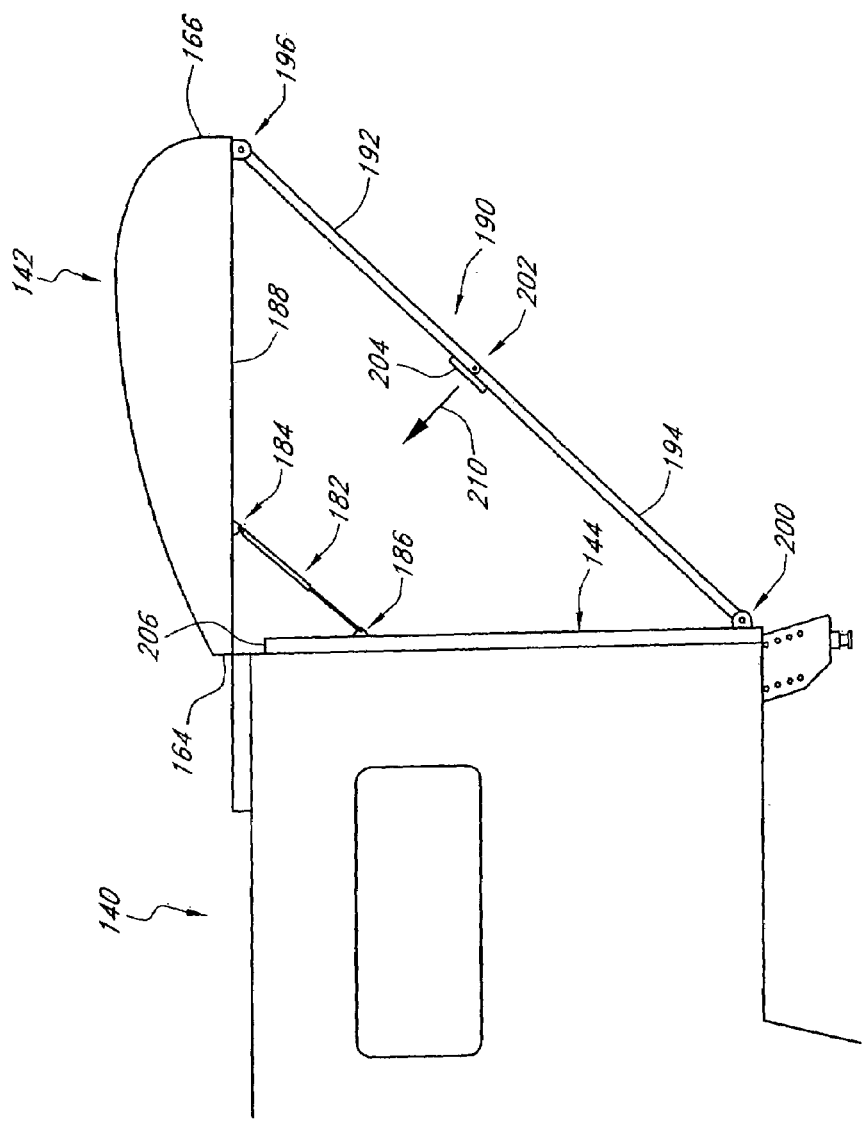
FIGS. 5A–C show side views of the front awning with various embodiments of extension poles that provide bracing support for the deployed front awning.

FIG. 5A shows a side view of one embodiment of the front portion of the trailer 140 with the front awning 142 in the deployed configuration. In one embodiment, one end of a power strut 182 is coupled to a first coupling assembly 184 located along a side edge 188 of the front awning 142, and the other end is coupled to a second coupling assembly 186 located along the side edge of the front wall 144. In one embodiment, there are two such power struts 182—one on each sides of the front awning 142.

The example power strut 182 shown in FIG. 5A is in an extended configuration as urged by a compressed gas contained therein. As is understood, such urged extension of the power strut 182 assists in the raising of the front awning 142. When the front awning 142 is lowered for retraction, lowering of the front awning (after disengaging extension poles) is resisted by the power struts 182 but aided by gravity, thereby providing a controllable lowering of the front awning 142. Thus, the power struts 182 allow the front awning 142 to be deployed by one user.

In one embodiment, the second coupling assembly 186 is fixedly attached to the front wall 144 at a selected vertical distance from a top edge 206 of the front wall 144. The power strut 182 is coupled to the second coupling assembly 186 such that the power strut 182 can rotate about the second coupling assembly 186 as the front awning 142 is either deployed or retracted. Similarly, the power strut 182 is coupled to the first coupling assembly 184 such that the power strut 182 can rotate about the first coupling assembly 184 as the front awning 142 is either deployed or retracted.

In one embodiment, the first coupling assembly 184 is coupled to the side edge 188 of the front awning 142 in such a manner that allows the first coupling assembly 184 to move along the side edge 188 in a limited range of motion. Such limited range of motion may be along the side edge 188, from the location of the first coupling assembly 184 in the deployed configuration of FIG. 5A to a location close to the hinged end 164 of the front awning 142. Thus, as the front awning 142 is being retracted, the power strut 182 can be compressed and simultaneously be urged into a generally vertical orientation by the motion of the first coupling assembly 184 along the side edge 188. The first coupling assembly 184 may be spring biased towards its deployed position (as in FIG. 5A). Thus, as the front awning 142 is being deployed from the retracted position, the first coupling assembly 184 snaps into its deployed position and provides the power assist in raising the front awning 142.

One can see that other couplings of the power struts 182 are possible. For example, the coupling assembly 184 may be fixedly attached to the side edge 188 of the front awning 142, and the limited sliding motion of the coupling assembly 186 along the front wall 144 can achieve a similar deployment and retraction of the power struts 182. In another example, both of the coupling assemblies 184 and 186 can move along their respective coupling locations. In yet another example, the power struts 182 may be retractable sufficiently that fixed attachments at both of its ends may be accommodated by the retracting power struts 182 as the awning 142 is moved to its retracted configuration.

FIG. 5A also shows one embodiment of an extension pole 190 that braces the deployed front awning 142. In one embodiment, the front awning 142 is braced by two such extension poles 190—one on each side of the front awning 142. The extension pole 190 includes a first section 192 and a second section 194. One end of the first section 192 and one end of the second sections 194 are hingeably coupled at a folding assembly 202. The other end of the first section 192 is coupled to a first pole coupling assembly 196 located along the side edge 188 adjacent the opening end 166 of the front awning 142. The other end of the second section 194 is coupled to a second pole coupling assembly 200 located adjacent the bottom portion of the front wall 144.

In one embodiment, the first and second pole coupling assemblies 196, 200 are coupled to their respective locations and allow their respective pole sections 192, 194 to rotate thereabout. Thus, the extension pole 190 can fold at the folding assembly 202 as the first and second coupling assemblies 196, 200 are brought towards each other, as when the front awning 142 is retracted. In one embodiment, the folding assembly 202 includes a folding stop 204 disposed on the inner side so as to prevent the folding assembly 202 from folding outwards (away from the front wall 144). Thus, the folding of the extension pole 190 is limited towards the inner side as indicated by an arrow 210.

In one embodiment, the first and second sections 192, 194 of the extension pole 190 include hollow metal tubes positioned next to each other laterally. Thus when in the folded configuration (front awning retracted), the two sections 192, 194 are positioned next to each other and generally extending vertically adjacent the front wall 144.

Figure 5B:
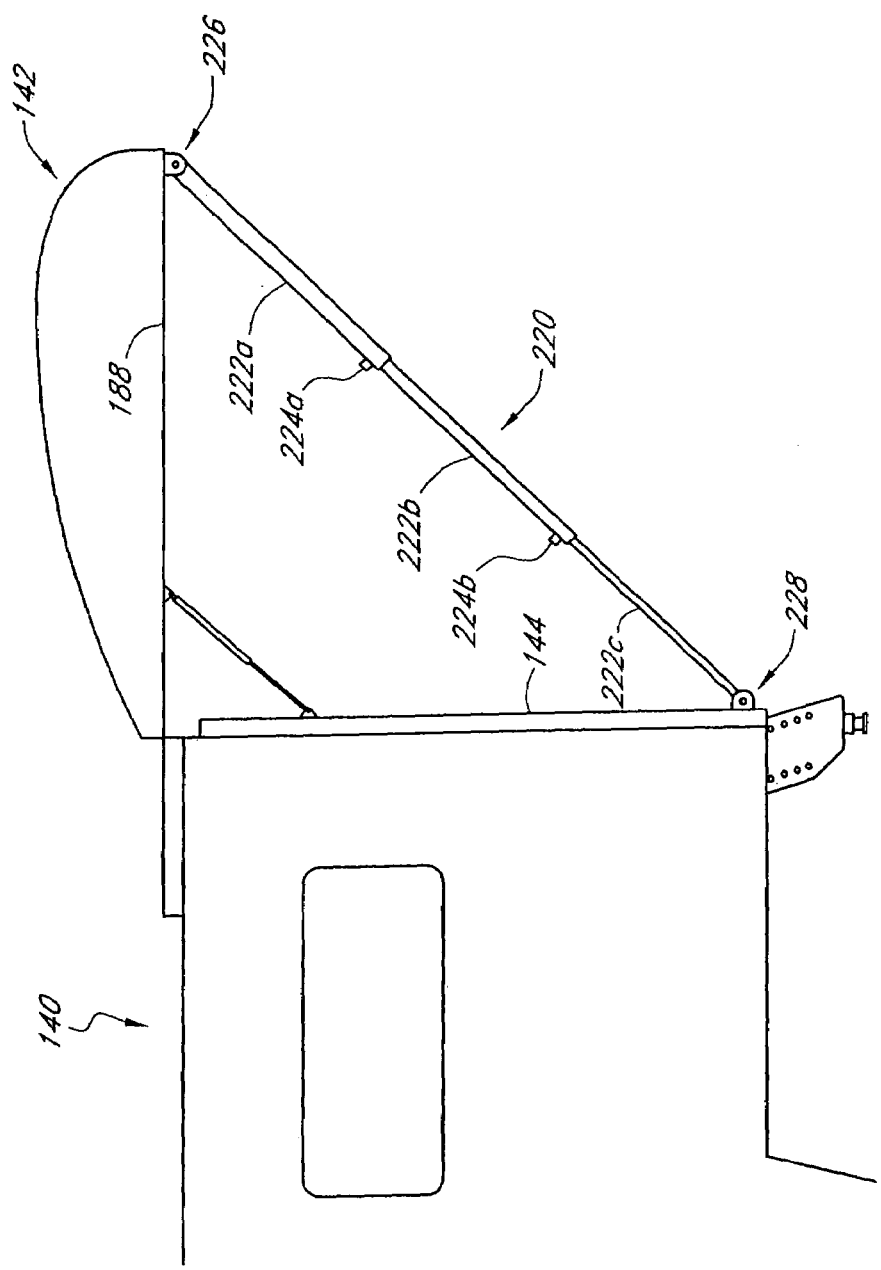

FIG. 5B shows another embodiment of an extension pole 220 coupled to the front awning 142 via a first pole coupling assembly 226 and also to the front wall 144 via a second pole coupling assembly 228. In one embodiment, the extension pole 220 includes two or more telescoping sections. As an example, three sections 222a–c are shown in FIG. 5B. Such telescoping sections can be retracted into or extended out of the progressively larger sized adjacent sections, thereby providing a relatively short retracted pole or a relatively long extended pole (such as that shown in FIG. 5B). In one embodiment, the telescoping extension pole 220 may also include locking tabs 224a, b that lock the telescoping sections 222a–c when in the extended configuration, thereby preventing unwanted retraction of the pole 220.

In one embodiment, the front awning 142 is braced by two such extension poles 220—one on each side of the front awning 142. In one embodiment, the extended geometry of the extension pole 220 is similar to the pole 190 described above in reference to FIG. 5A. While the folding pole 190 allowed the front awning 142 to be closed, the telescoping pole 220 maintains a finite minimum length when in the retracted configuration. Thus in one configuration, the first pole coupling assembly 226 may be adapted to move along the side edge 188 of the front awning 142 (in a similar manner as that of the power strut coupling assembly 184 described above in reference to FIG. 5A), thereby allowing the front awning 142 to close. When closed, the retracted telescoping pole 220 may be in a generally vertical orientation (pivoted about the second pole coupling assembly 228) adjacent the front wall 144.

Figure 5C:
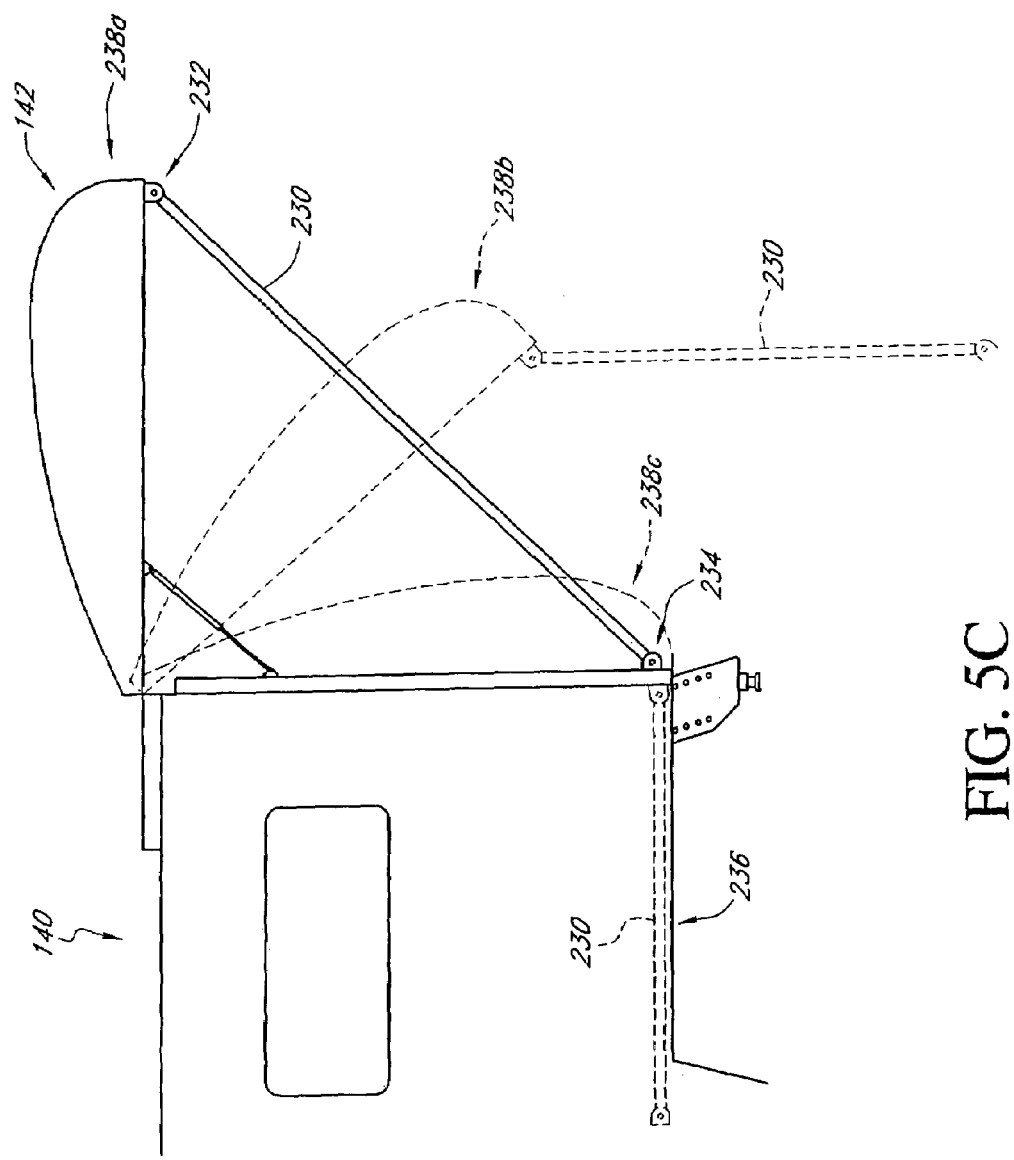

FIG. 5C shows yet another embodiment of an extension pole 230 coupled to the front awning 142 via a first pole coupling assembly 232 and also to the front wall 144 via a second pole coupling assembly 234. In one embodiment, the extension pole 230 includes a single section that is pivotally attached to the first pole coupling assembly 232 and detachably coupled to the second pole coupling assembly 234.

Thus when the front awning 142 is in a deployed configuration 238a, the extension pole 230 is coupled to both of the first and second pole coupling assemblies 232 and 234. To lower the front awning 142, the extension pole 230 is detached from the second pole coupling assembly 234, thereby allowing the front awning to be lowered. As previously described, the power struts can prevent the front awning 142 from falling freely. A partially lowered (or partially raised) configuration 238b shows that the extension pole 230 detached from the second pole coupling assembly 234. In a lowered (retracted) configuration 238c, the extension pole 230 may be secured to the front portion of the trailer 140 in a variety of ways via a pole securing assembly 236. For example, the pole 230 may be secured under or at the side of the trailer 140.

In one embodiment, the front awning 142 is braced by two such extension poles 230—one on each side of the front awning 142. In one embodiment, the extended geometry of the extension pole 230 is similar to the pole 190 described above in reference to FIG. 5A.

From the foregoing description of the various possible embodiments of the extension poles, it will be appreciated that the front awning 142 can be supported in its deployed configuration in a number of ways. Thus, other types of poles or other functionally similar bracing means can be used to support and brace the front awing 142 without departing from the spirit of the present teachings.

Figure 6:
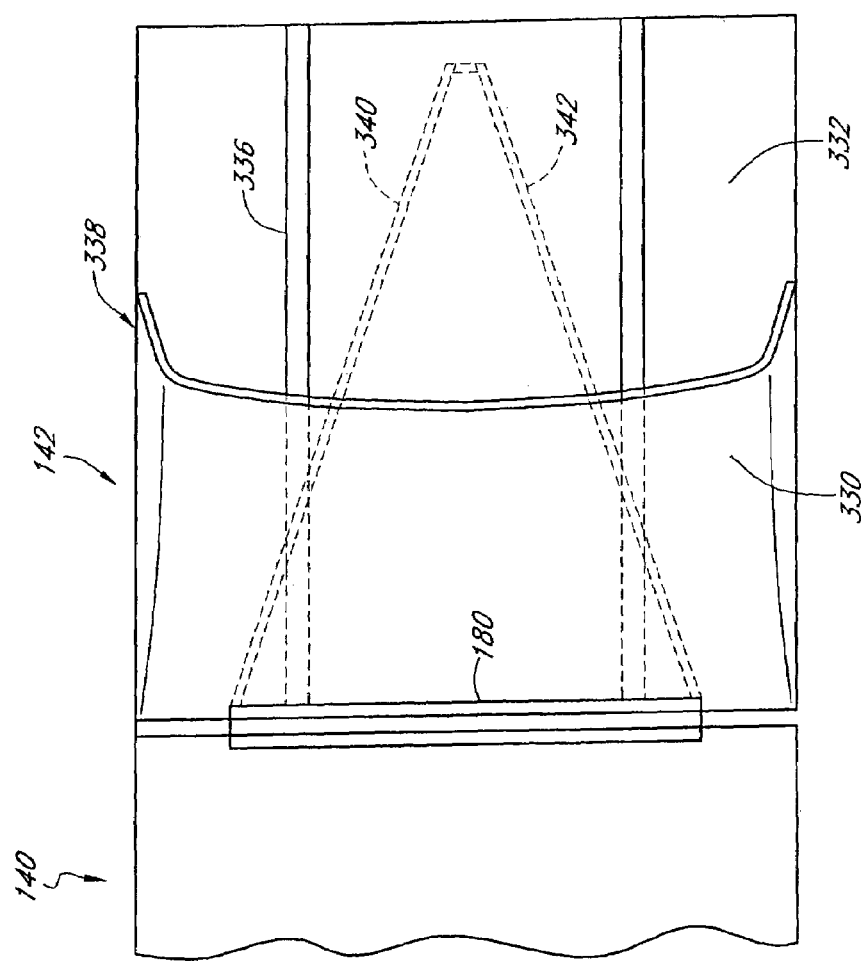
FIG. 6 shows a top view of the deployed front awning, showing a partial cutaway view of a shell structure of the front awning and one possible manner in which the front awning can be coupled to a housing of the recreational vehicle.

FIG. 6 shows a top view of the front portion of the trailer 140 with its front awning 142 deployed. In particular, the front awning 142 is depicted in a partially cutaway view, showing that in one embodiment, the front awning 142 includes a shell 338 having a curved portion 330 and a panel portion 332. The curved portion 330 provides the aerodynamic shape when the front awning 142 is in its retracted configuration. In one embodiment, the panel portion 332 is generally parallel to and adjacent the front wall 144 when the front awning 142 is in its retracted configuration.

In one embodiment, the shell 338 is fabricated out of resilient material such as fiberglass or plastic. The curved portion 330 and/or the panel portion 332 may include ribbed features 336 to provide structural resistance to warping and other distorting effects. Furthermore, the curved portion 330 and/or the panel portion 332 may also define recess(es) dimensioned to accommodate parts associated with the front awning 142 and/or the trailer 140. For example, recesses may be formed in the panel portion 332 to accommodate the power struts and the extension poles when the front awning 142 is in the retracted configuration. It will be appreciated that the shell 338 defining a hollow inner space 334 therein can be fabricated in any number of known methods without departing from the spirit of the present teachings. As an example, the shell 338 can be molded as formed as a single piece. In another example, the shell 338 can be formed by securely joining the curved portion 330 to the panel portion 332.

In one embodiment, the panel portion 332 of the front awning 142 has embedded in it first and second reinforcing rods 340 and 342. The reinforcing rods 340, 342 may include metal rods or any other similarly rigid rods. Embedding of the rods 340, 342 firmly ties the rods 340, 342 to the panel portion 332, and thereby to the front awning 142. In one embodiment, first ends of the embedded rods 340, 342 are attached to the ends of the hinge 180. Second ends of the embedded rods 340, 342 are positioned closer to each other than the length of the hinge 180. In one embodiment, the second ends of the embedded rods 340, 342 are attached to each other. Thus, the two embedded metal rods 340, 342 and the hinge 180 generally form a triangular shaped brace that firmly ties the front awning 142 to the hinge 180 in a more secure manner than if the shell 338 is attached to the hinge 180 alone. In another embodiment, the rods 340, 342 are embedded in the panel 332 sufficiently rigidly so that their second ends need not be attached to each other. Thus, one can see that the reinforcing rods 340 and 342 can be configured in a variety of ways to provide stiffening effect and/or robust attachment to the front portion of the trailer 140.

In the embodiment shown in FIG. 6, the hinge 180 is a single piece hinge. It will be appreciated that multiple-piece hinges may be used without departing from the spirit of the present teachings. If such multiple piece hinges are used, the embedded rod bracing configuration can be modified to accommodate the multiple pieces of the hinge.

Figure 7A:
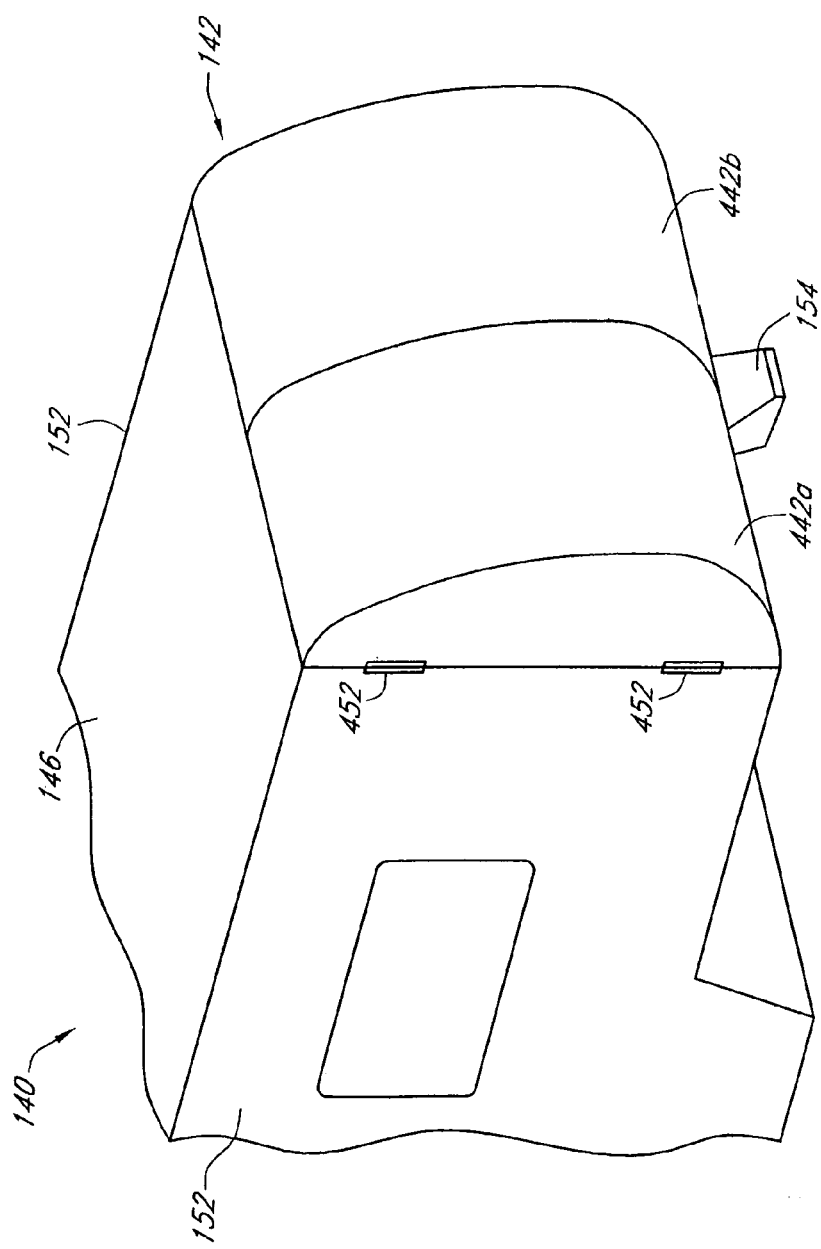
FIGS. 7A–D show one embodiment of a side-opening front awning assembly.

FIGS. 7A–7D now show another embodiment of the front awning 142. In particular, FIG. 7A shows a perspective view of the trailer 140 with the front awning 142 having first and second members 442a, 442b in a retracted configuration. In one embodiment, the front awning 142 is sized so as to at least partially cover the front wall 144 (FIG. 3) and can be partitioned into sections as the first and second members 442a, 442b. It should be appreciated that the first and second members 442a, 442b of the front awning 142 can be dimensioned similarly, or differently, depending on a particular design.

Figure 7B:
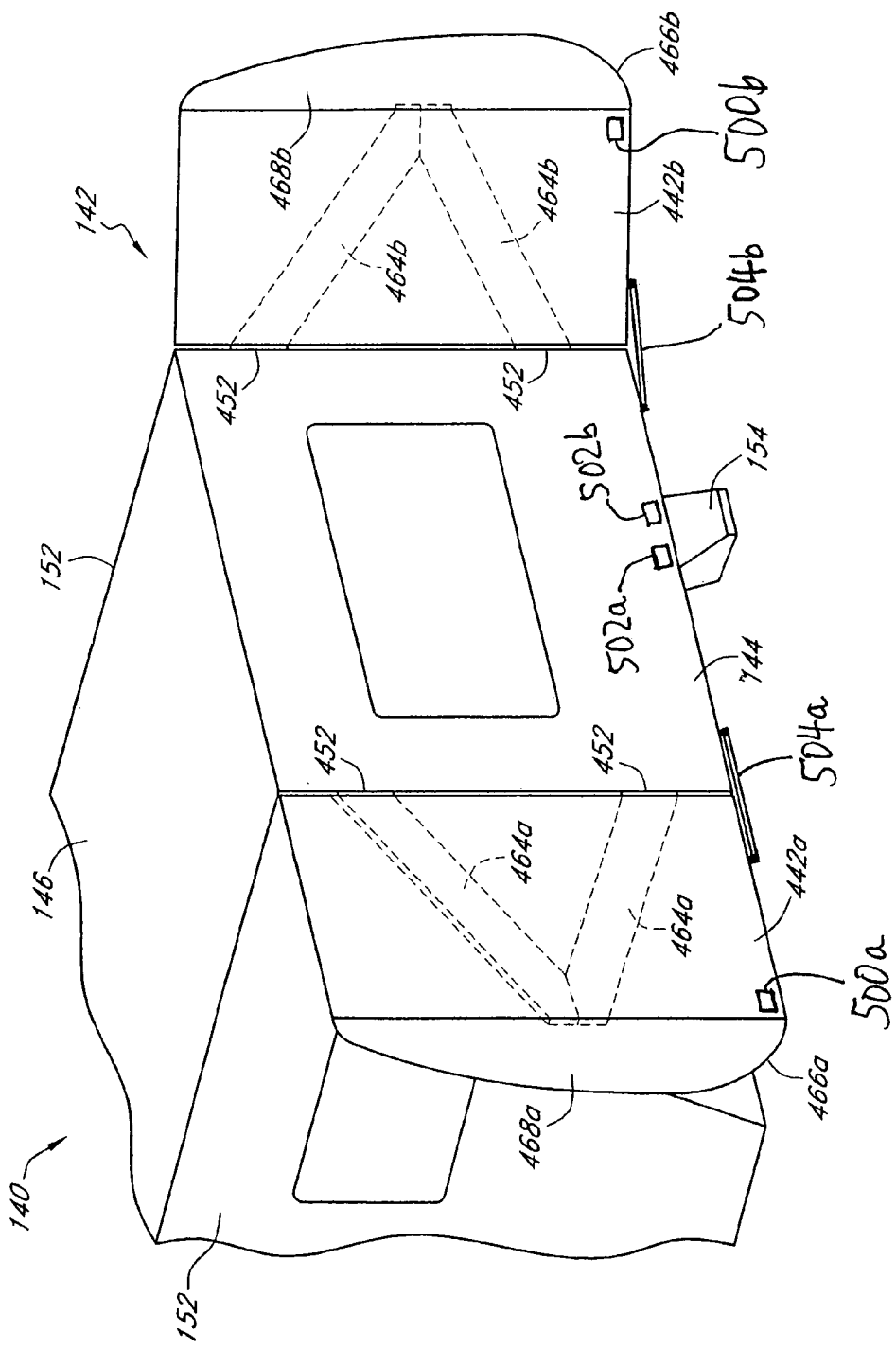

FIG. 7B shows a perspective view of the trailer 140 with the first and second members 442a, 442b of the front awning 142 in a deployed configuration. In one embodiment, as shown in FIGS. 7A and B, the first and second members 442a, 442b of the front awning 142 are hingedly attached to the front portion of the sidewalls 152 of the trailer 140 via one or more hinge assemblies 452. As further shown in FIG. 7B, the first and second members 442a, 442b are configured to swing outward from the retracted position so as expose the front wall 144 of the trailer 140. Moreover, the first and second members 442a, 442b are also configured to swing inward from the deployed position so as conceal or cover the front wall 144 of the trailer 140.

FIG. 7B shows one embodiment of a latching assembly that allows the first and second members 442a and 442b to remain securely in a closed configuration such as that of FIG. 7A. In one embodiment, the latching assembly includes first and second latching members 500a and 500b disposed on the first and second members 442a and 442b. Corresponding latching members 502a and 502b are shown to be disposed at locations selected to mate with the first and second latching members 500a and 500b.

One can see from FIG. 7B that the first and second members 442a and 442b have similar configuration as a door. Thus, the latching assembly can include any number of mechanisms suitable for use in doors.

FIG. 7B also shows one embodiment of a bracing assembly that allows the first and second members 442a and 442b to remain open in selected configurations. For example, a brace 504a couples the first member 442a to a location near the front wall 144, and is shown to allow the first member 442a to be in a fully-open orientation. A brace 504b couples the second member 442b to a location near the front wall 144, and is shown to allow the second member 442b to be in a partially-open orientation. As one can see, such braces can be implemented using any of many available designs, including folding types or extending types. Moreover, the end(s) of the braces may be mounted slidably so as to allow flexibility in design without departing from the spirit of the present teachings.

One can see that by having the first and second members 442a and 442b remain open at different orientations can be advantageous. For example, if a harsh sunlight shines from the side of the second member 442b in FIG. 7B, having the second member 442b in such a partial open orientation can block the sunlight from reaching the front window. At the same time, the user may want to open the first member 442a fully to have a greater view towards that side.

Figure 7C:
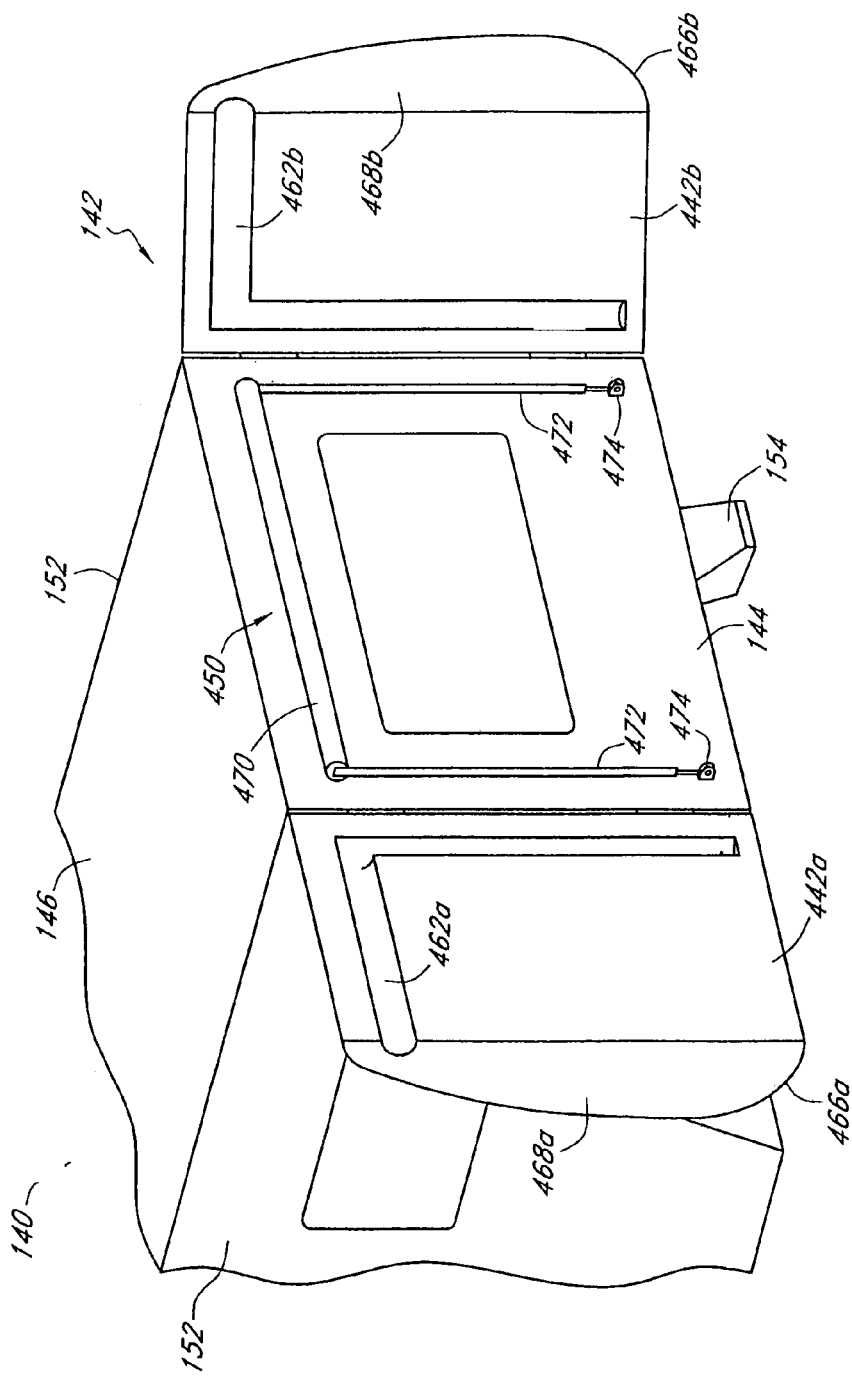
Figure 7D:
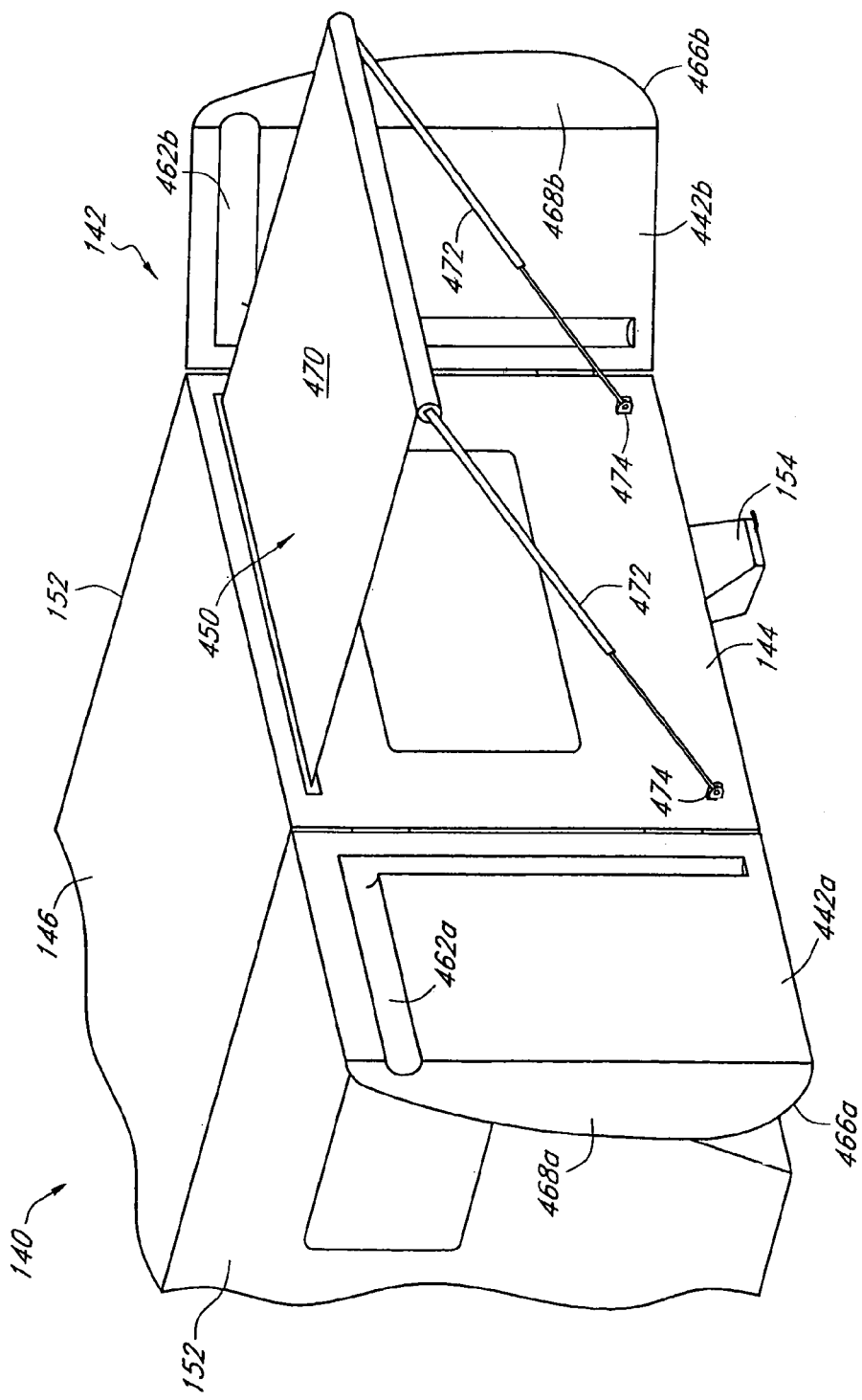

FIG. 7C shows a perspective view of one embodiment of the trailer 140 with the first and second members 442a 442b of the front awning 142 in a deployed configuration such that a cover assembly or secondary awning 450 is exposed. FIG. 7D shows a perspective view of the cover assembly 450 in a deployed configuration. In one embodiment, the cover assembly 450 includes a generally known retractable/deployable recreational awning having a fabric cover 470 and support legs 472 that are either attached to front wall 144 of the trailer 140 via rotatable fasteners 474 or can be staked in the ground (not shown) in a generally known manner. It should be appreciated that the support legs 472 may include telescoping functionality or various extendable features as shown in FIGS. 7C, 7D. It should further be appreciated that the fabric cover 470 may be formed from materials such as fiber, plastic, or various other types of materials, without departing from the scope of the present teachings.

In one embodiment, as shown in FIGS. 7C, 7D, the first and second members 442a, 442b of the front awning or enclosure 142 include interior walls 460a, 460b each having a recessed portion 462a, 462b, respectively, that is contoured to receive parts associated with the second awning 450 when the first and second members 442a, 442b are retracted. The recessed portions 462a, 462b allow the first and second members 442a, 442b of the front awning 142 to retract such that the interior walls 460a, 460b abut the front wall 144 of the trailer 140. Advantageously, this allows the front awning 142 to sit substantially flush against the front wall 144 of the trailer 140 when the first and second members 442a, 442b are retracted.

Additionally, in one embodiment, the first and second members 442a, 442b of the front awning 140 each include an exterior shell section 466a, 466b attached to the interior walls 460a, 460b with common walls 468a, 468b therebetween. In one embodiment, the exterior shell sections 466a, 466b have curved contours that provide an aerodynamic shape to the front awning or enclosure 142. It should be appreciated that the interior walls 460a, 460b and the exterior shell section 466a, 466b of the front awning or enclosure 142 can be constructed and reinforced in a manner to the panel portion 332 and shell 338 described above in reference to FIG. 6. Thus, the interior walls 460a, 460b and the exterior shell sections 466a, 466b of the front awning or enclosure 142 of FIGS. 7A–7D may include similar ribbed structures and imbedded reinforcing members.

As shown in FIG. 7B, the first and second members 442a, 442b of the front awning or enclosure 142 can each include one or more reinforcing supports 464a, 464b that generally form a triangular shaped brace that firmly ties the front awning 142 to the one or more hinge assemblies 452 in a more secure manner. It should be appreciated that the reinforcing supports 464a, 464b of the front awning or enclosure 142 can be similar in scope to the reinforcing rods 340, 342 as described above in reference to FIG. 6.

Figure 8:
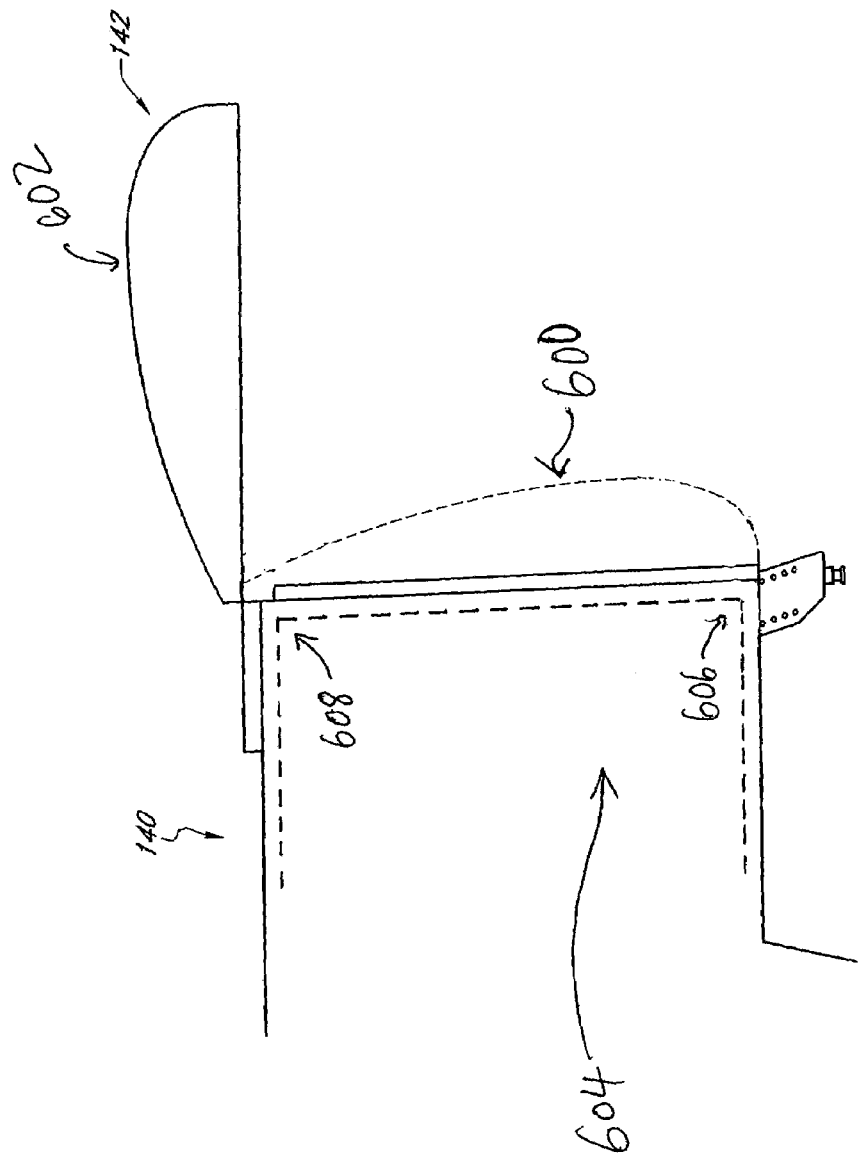
FIG. 8 shows how the front awning assembly allows more efficient use of the front portion of the interior of the RV.

FIG. 8 now shows one advantage that can be achieved by the various embodiments of the front awning/cover 142 described above. As described above, various embodiments of the front awning/cover 142 in their closed configuration 600 can provide an aerodynamic profile for the front portion of the trailer 140. Also, various embodiments of the front awning/cover 142 in their deployed configuration 602 can provide various awning or cover functions for the front portion of the trailer 140.

As further shown in FIG. 8, use of such a front awning/ cover 142 also allows the front portion of the trailer 140 to be designed in a more flexible manner. In one embodiment, because the front awning/cover 142 provides the aerodynamic profile, the remaining portion of the front of the trailer can be designed with a square end. In such a square-end front, a front interior 604 can have generally square lower and upper corners 606 and 608. Such a square-ended interior 604 can allow a more efficient use of the available interior space, since the contour of the interior does not need to be dictated by the external profile of the front portion of the trailer (e.g., for aerodynamic reasons).

Although the above-disclosed embodiments of the present invention have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the present invention. Consequently, the scope of the invention should not be limited to the foregoing description, but should be defined by the appended claims.

What is claimed is:

1. A recreational vehicle comprising:
  a chassis with wheels mounted thereto so as to allow rolling motion of the recreational vehicle;
  a main housing mounted to the chassis, the main housing having a front wall, a rear wall, and at least two side walls interposed between the front and rear walls so as to define an interior space having a roof and a floor, wherein the front wall includes a window;
  a cover mounted adjacent the front wall so as to be movable between a closed configuration and an open configuration, wherein the cover has a side profile shape that has a first contour and a second contour wherein the first contour is separated from the second contour by varying thickness so that when in the closed configuration the second contour conforms to the contour of the front wall and the first contour provides a desired contour to a front portion of the recreational vehicle that is different than the contour of the front wall, and wherein the cover in its open configuration provides a cover for at least a portion of the front wall;
  wherein the cover comprises first and second side-mounted members, the first side-mounted member being hingeably mounted adjacent one of the two side edges of the front wall and the second side-mounted member being hingeably mounted adjacent the other side edge of the front wall, each of the two side-mounted members comprising a shell structure that is substantially non-collapsible, such that the two side-mounted members in their closed configuration provide an aerodynamic shape, and such that the two side-mounted members can swing out sideways about their respective hinges so as to be in their open configuration to provide a front view from the interior space through the window in the front wall.

2. The recreational vehicle of claim 1, further comprising first and second brace members that allows the two side-mounted members to be positioned in at least one open configuration.

3. The recreational vehicle of claim 1, further comprising a latching mechanism that allows the two side-mounted members to be secured in the closed configuration.

4. The recreational vehicle of claim 1, further comprising an awning mounted to the front wall so as to provide cover for the front wall when deployed.

5. The recreational vehicle of claim 4, wherein the first and second side-mounted members define a recess that accommodates at least a portion of the awning when the awning is in its retracted configuration.

6. The recreational vehicle of claim 1, wherein the front wall is oriented substantially perpendicular to the roof and the floor to provide more efficient use of the front portion of the interior space, wherein the shape of the cover provides the aerodynamic profile to an otherwise non-aerodynamic profile associated with the perpendicular front wall.

7. The recreational vehicle of claim 1, wherein the front wall includes a window.

8. The recreational vehicle of claim 1, wherein the recreational vehicle is a fifth-wheel trailer.

* * * * *